United States Patent
Park et al.

(10) Patent No.: US 9,710,083 B2
(45) Date of Patent: Jul. 18, 2017

(54) LIQUID CRYSTAL DISPLAY WITH INTEGRATED TOUCH SENSOR

(71) Applicant: SAMSUNG DISPLAY CO., LTD., Yongin, Gyeonggi-Do (KR)

(72) Inventors: Jin-Woo Park, Yongin (KR); Sang-Jin Pak, Yongin (KR); Sang-Kwon Ha, Yongin (KR); Ji-Gong Lee, Yongin (KR); Hideo Yoshimura, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/023,518

(22) Filed: Sep. 11, 2013

(65) Prior Publication Data

US 2014/0184533 A1    Jul. 3, 2014

(30) Foreign Application Priority Data

Dec. 31, 2012 (KR) .................. 10-2012-0157812

(51) Int. Cl.
*G06F 3/041* (2006.01)
*G09G 3/36* (2006.01)

(52) U.S. Cl.
CPC .......... *G06F 3/0412* (2013.01); *G06F 3/0416* (2013.01)

(58) Field of Classification Search
CPC .............................. G06F 3/0412; G06F 3/0416
USPC ........................................................ 345/173
See application file for complete search history.

(56) References Cited

U.S. PATENT DOCUMENTS

| | | | |
|---|---|---|---|
| 8,891,048 B2* | 11/2014 | Park et al. | 349/139 |
| 2006/0201931 A1* | 9/2006 | Lee et al. | 219/497 |
| 2008/0246739 A1* | 10/2008 | Choi | G02F 1/167 345/173 |
| 2010/0182273 A1* | 7/2010 | Noguchi et al. | 345/174 |
| 2011/0102389 A1* | 5/2011 | Park | G06F 3/0412 345/205 |
| 2011/0221724 A1* | 9/2011 | Kurokawa et al. | 345/207 |
| 2011/0267283 A1 | 11/2011 | Chang et al. | |
| 2012/0050217 A1* | 3/2012 | Noguchi et al. | 345/174 |
| 2012/0105752 A1* | 5/2012 | Park | G02F 1/13338 349/33 |

(Continued)

FOREIGN PATENT DOCUMENTS

| | | |
|---|---|---|
| JP | 2012-48295 A | 3/2012 |
| KR | 10-2006-0097819 A | 9/2006 |
| KR | 10-2011-0068148 A | 6/2011 |

*Primary Examiner* — Temesghen Ghebretinsae
*Assistant Examiner* — Benyam Ketema
(74) *Attorney, Agent, or Firm* — Lee & Morse P.C.

(57) ABSTRACT

A liquid crystal display integrated with a touch sensor includes a first substrate including pixels connected to gate wires and data wires, a second substrate positioned to face the first substrate, a plurality of common electrodes corresponding to the pixels, a plurality of sensing electrodes on the second substrate, a liquid crystal layer between the first substrate and the second substrate, a gate drive unit driven corresponding to a gate control signal and configured to supply a gate signal to the pixels through the gate wires, a common electrode drive unit configured to supply a touch driving signal to the common electrodes during a touch driving period, and a control unit configured to supply a gate control signal synchronized with the touch driving signal to the gate drive unit.

12 Claims, 8 Drawing Sheets

(56) References Cited

U.S. PATENT DOCUMENTS

2014/0139459 A1* 5/2014 Wu ................ G06F 3/0416
 345/173

* cited by examiner

LIQUID CRYSTAL DISPLAY WITH INTEGRATED TOUCH SENSOR

CROSS-REFERENCE TO RELATED APPLICATION

This application claims priority to and the benefit of Korean Patent Application No. 10-2012-0157812, filed on Dec. 31, 2012, in the Korean Intellectual Property Office, the entire content of which is incorporated herein by reference.

BACKGROUND

1. Field

Embodiments relate to a liquid crystal display.

2. Description of the Related Art

As the interest in information display and the requirement to use portable information media are increased, research and commercialization of flat panel displays (FPD), as a substitute for cathode ray tube (CRT) displays, have been conducted. Particularly, among the flat panel displays, a liquid crystal display (LCD) is a device which uses optical anisotropy of a liquid crystal to display images. The liquid crystal display is excellent in brightness, color display, and display quality, and is suitable for a lap top computer and a desktop monitor, or the like. Meanwhile, in a liquid crystal display, according to requests from users about input convenience, a function of touch screen capable of inputting an user's command by selecting instructions displayed on a screen with his/her hand or an object is desired.

SUMMARY

Embodiments are directed to a liquid crystal display integrated with a touch sensor, the display including a first substrate including pixels connected to gate wires and data wires, a second substrate positioned to face the first substrate, a plurality of common electrodes corresponding to the pixels, a plurality of sensing electrodes on the second substrate, a liquid crystal layer between the first substrate and the second substrate, a gate drive unit driven corresponding to a gate control signal and configured to supply a gate signal to the pixels through the gate wires, a common electrode drive unit configured to supply a touch driving signal to the common electrodes during a touch driving period, and a control unit configured to supply a gate control signal synchronized with the touch driving signal to the gate drive unit.

The gate control signal may have a width that is an integer multiple of a width of the touch driving signal.

The gate control signal may include a first clock signal and a second clock signal having a reversed phase from each other.

The common electrode drive unit may be configured to supply a common voltage to the common electrodes during a display period.

The display period and the touch driving period may alternate.

The touch driving signal may have a higher voltage than that of the common voltage.

The common electrodes may be positioned on the first substrate or the second substrate.

The display may further include a first polarizing plate and a second polarizing plate respectively attached to an external surface of the first substrate and the second substrate, and a window attached to an external surface of the second polarizing plate.

The sensing electrodes may be between the second substrate and the window.

The display may further include a back light positioned below the first substrate and configured to supply light.

The common electrodes and the sensing electrodes may intersect with each other.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "on" another element, it can be directly on the other element, or one or more intervening elements may also be present. It will also be understood that when an element is referred to as being "under" another element, it can be directly under, or one or more intervening elements may also be present. It will also be understood that when an element is referred to as being "between" two elements, it can be the only element between the two elements, or one or more intervening elements may also be present. Also, when an element is referred to as being "connected to" another element, it can be directly connected to the another element or be indirectly connected to the another element with one or more intervening elements interposed therebetween. Like reference numerals refer to like elements throughout.

Figure 1:
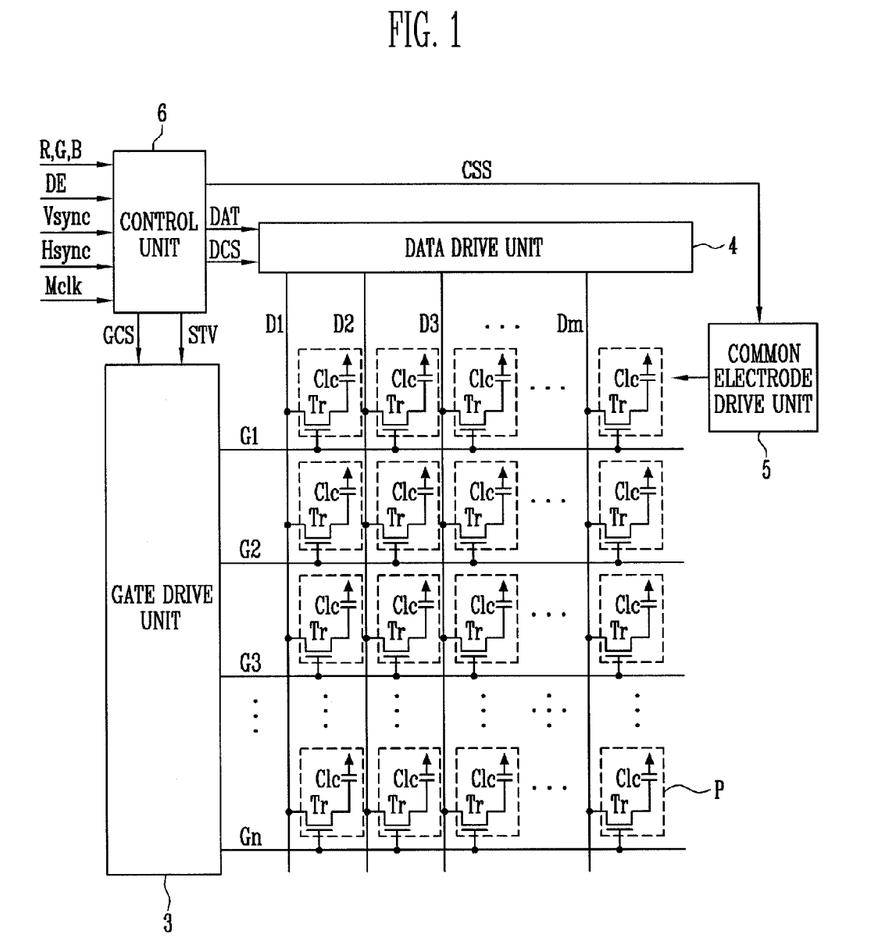
FIG. 1 is a block diagram showing a liquid crystal display integrated with a touch sensor according to an example embodiment.
Figure 2:
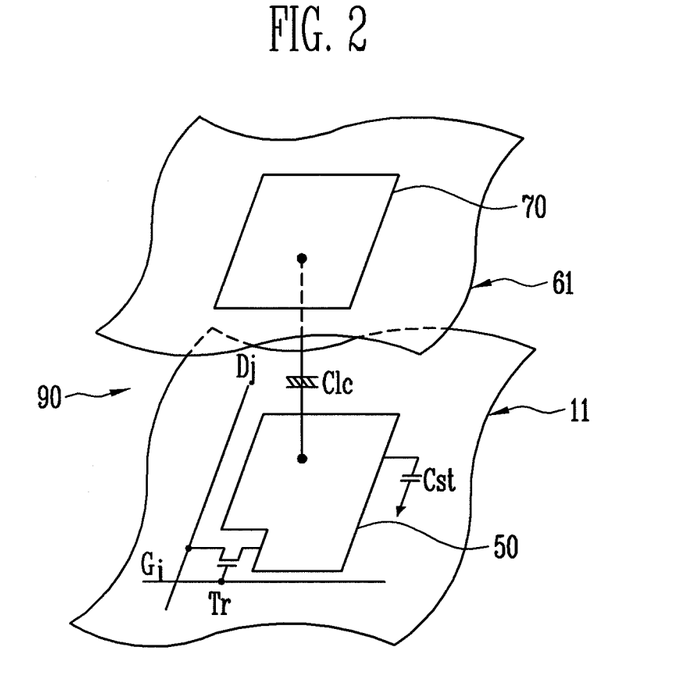
FIG. 2 is an equivalent circuit diagram for the display shown in FIG. 1.
Figure 3:
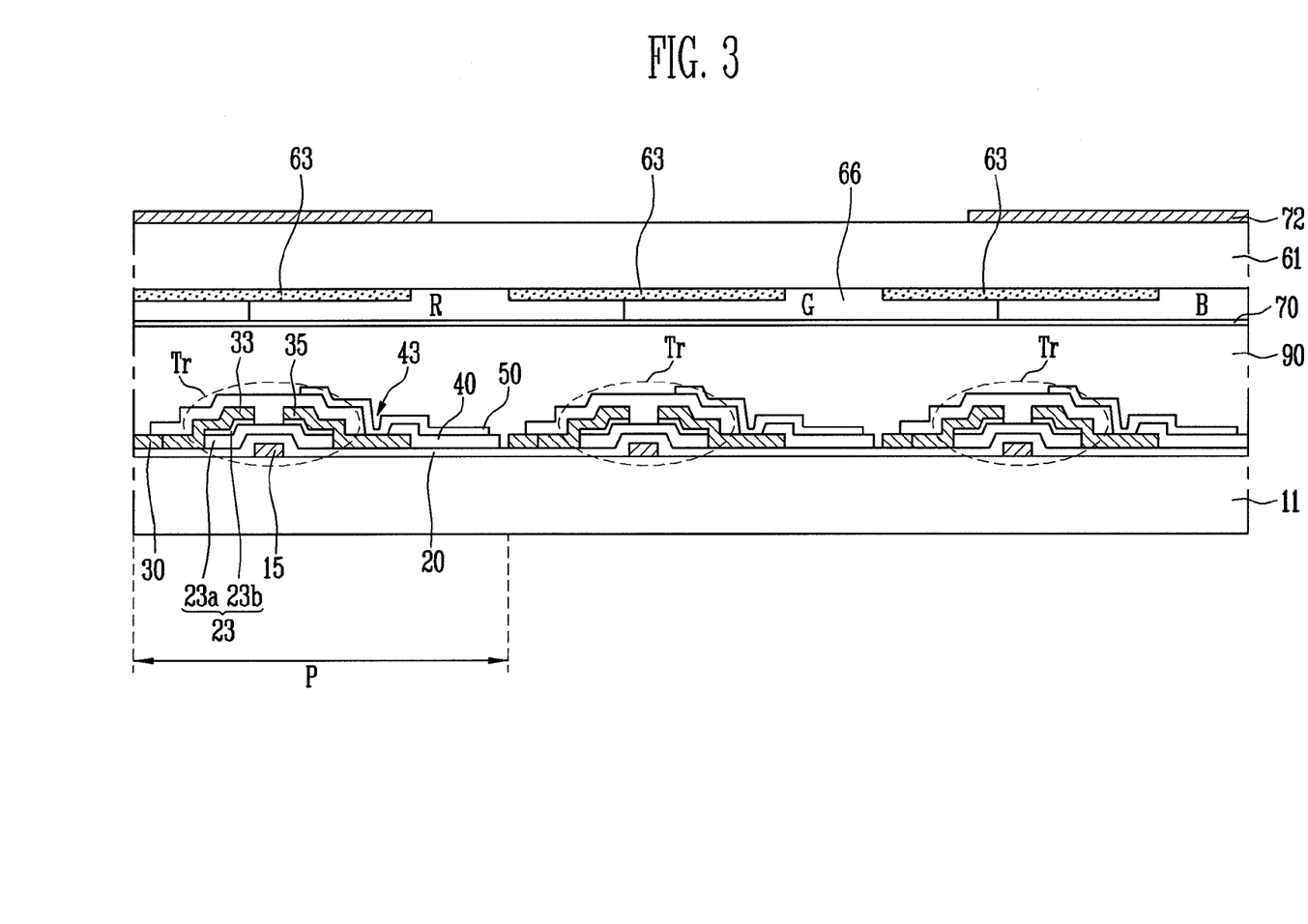
FIG. 3 is a cross-sectional view showing a region of a liquid crystal display integrated with a touch sensor according to an example embodiment.
Figure 4:
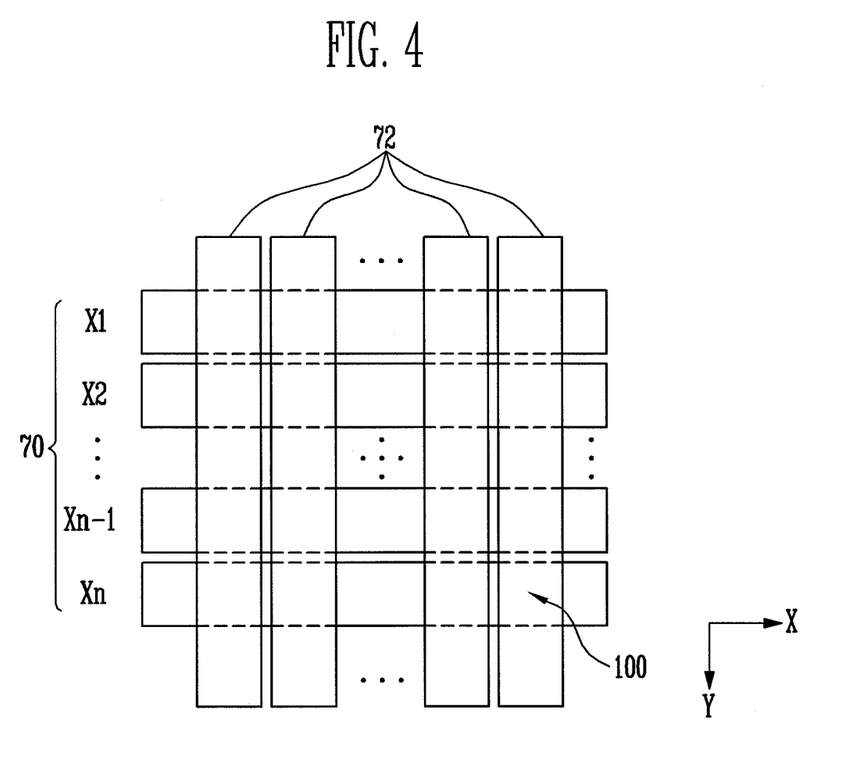
FIG. 4 is a view showing a common electrode and a sensing electrode according to an example embodiment.

FIG. 1 is a block diagram showing a liquid crystal display integrated with a touch sensor according to an example embodiment. Particularly, a configuration of displaying image from the liquid crystal display integrated with a touch sensor is shown in FIG. 1. FIG. 2 is an equivalent circuit diagram for the display shown in FIG. 1, and FIG. 3 is a cross-sectional view showing a region of a liquid crystal display integrated with a touch sensor according to an example embodiment. In addition, FIG. 4 is a view showing a common electrode and a sensing electrode according to an example embodiment.

In the example embodiment shown in FIG. 1, a liquid crystal display integrated with a touch sensor includes: a gate drive unit 3 configured to supply gate signals to gate wires G1 to Gn arranged in a first direction (for example, in a horizontal direction), a data drive unit 4 configured to supply data signals to data wires D1 to Dm arranged in a second direction (for example, in a vertical direction) which is intersected with the first direction, a plurality of pixels P connected to the gate wires G1 to Gn and the data wires D1 to Dm, a common electrode drive unit 5 controlling a common electrode 70 and a control unit 6 controlling the gate drive unit 3, the data drive unit 4, and the common electrode drive unit 5, or the like.

The liquid crystal display is a display for implementing image using optical anisotropic and polarization of liquid crystal, the liquid crystal having optical anisotropy and having thin and long molecule structure and directivity of arrangement, and having a polarization transformed in magnitude according to a molecule arrangement direction when the liquid crystal is in an electric filed.

The liquid crystal display may have a liquid crystal panel which is configured by attaching a first substrate and a second substrate to each other between a pixel electrode, the common electrode, the liquid crystal display layer. The liquid crystal display applies the data signals and the common voltage, respectively and forms a predetermined electric field between the pixel electrode and the common electrode of pixels selected by the gate signals. Then, the liquid crystal display displays the image by controlling permeability of light supplied from a back light according to an arrangement angle of a transformed liquid crystal.

The liquid crystal display may be operated by a twisted nematic (TN) mode, a vertical alignment (VA) mode, an in plane switching (IPS) mode, and a plane to line switching (PLS) mode, or the like, according to a process of controlling an arrangement of the liquid crystal layer.

Among these, the IPS mode and the PLS mode are a process which disposes a pixel electrode 50 and the common electrode 70 on a lower substrate (for example, the first substrate 11) such that the arrangement of liquid crystal layer is controlled due to an electric field between the pixel electrode 50 and the common electrode 70. Although FIG. 2 shows an example embodiment of the common electrode 70 positioned on second the substrate 61, embodiments may be applied to the IPS mode and the PLS mode that the common electrode 70 is positioned on the first substrate 11 with the pixel electrode 50.

Referring to the example embodiments shown in FIGS. 2 and 3, the liquid crystal display integrated with a touch sensor is configured with the first and second substrates 11 and 61 face-attached to each other and including the liquid crystal layer therebetween. Among them, the gate wires G1 to Gn and the data wires D1 to Dm upwardly intersected with each other are arranged on the lower first substrate 11, and a transistor Tr is provided on the intersection between the gate wires G1 to Gn and the data wires D1 to Dm to be one-to-one connected to the pixel electrode 50 formed at each of pixels P.

Referring to FIG. 2, in more detail, the pixel P connected to a i-th gate wire Gi and a j-th data wire Dj includes: the transistor Tr connected to the i-th gate wire Gi and a j-th data wire Dj, the pixel electrode 50 connected to the transistor Tr, and a liquid crystal capacitor (Clc) and a storage capacitor (Cst) positioned between the pixel electrode 50 and the common electrode 70. In an implementation, the storage capacitor Cst may be omitted.

The transistor Tr may include a gate electrode 15, source/drain electrodes 33 and 35, and a semiconductor layer 33 formed between the gate electrode 15 and the source/drain electrodes 33 and 35. The semiconductor layer 23 may include an active layer 23a and an ohmic contact layer 23b.

In addition, a gate insulating film 20 is formed on the upper portion of the gate electrode 15, a protective layer 40 is formed on the upper portion of the source/drain electrodes 33 and 35, and the protective layer 40 may include a contact hole 43 exposing the drain electrode 35.

Further, the pixel electrode 50 is formed on the upper portion of the protective layer 40, the pixel electrode 50 may be connected to the drain electrode 35 through the contact hole 43.

Also, the transistor Tr is not limited to the structure shown in FIG. 3, and it may be formed as another structure.

The liquid crystal capacitor Clc may include the pixel electrode 50 and the common electrode 70 of the second substrate 61 as two terminals; a liquid crystal layer 90 between the two electrodes 50 and 70 may function as a dielectric.

The rear surface of second substrate 61 has a black matrix 63 having a lattice shape which surrounds the each of pixel P regions to cover non-display regions of the gate wires G1 to Gn, the data wires D1 to Dm, the transistor Tr, or the like.

In addition, the black matrix 63 may have a color filter pattern 66 therein so as to be arranged correspondingly to the each of pixels P, a plurality of common electrodes 70 may be existed in a lower portion of the color filter pattern 66.

The color filter pattern 66 may include red, green and blue color filter patterns R, G and B alternately arranged repeatedly.

An over coat layer (not shown) is further formed between the color filter pattern 66 and the common electrode 70.

Also, since positions of the black matrix 63 and the color filter pattern 66 may be changed, the common electrode 70 may be formed at the inner surface of the second substrate 61 when the black matrix 63 and the color filter pattern 66 are formed at other surfaces.

The common electrode 70 may be formed of a transparent conductive material, and also formed of other conductive material such as an opaque metal. For example, the common electrode 70 may be formed of indium tin oxide (ITO), indium zinc oxide (IZO), graphene, carbon nanotube, silver nanowires (AgNWs), and the like.

Although FIG. 2 shows an example embodiment of the common electrode 70 positioned on second the substrate 61, the common electrode 70 may be positioned on the first substrate 11, rather than the second substrate 61.

The common electrode 70 may be formed on either the same layer as the pixel electrode 50 according to the liquid crystal mode or another layer different from the pixel electrode 50.

An image display operation of the liquid crystal display integrated with a touch sensor having above-mentioned structure will be described below.

First, the gate signal is applied to the gate electrode 15 of the transistor Tr provided in each pixel P to activate the active layer 23a, and then the source electrode 33, and then the source electrode 33 supplied the data signal applied from the data wire 30, which is connected to the source electrode 33, to the drain electrode 35 having predetermined interval apart from thereof through the lower active layer 23a.

Since the drain electrode 35 is electrically connected to the pixel electrode 50 through the contact hole 43, voltage from the data signal applied to the pixel electrode 50 may be stored at the storage capacitor Cst provided at each pixel P.

By corresponding to the voltage of difference in between the voltage applied to the pixel electrode 50 and the voltage applied to the common electrode 70, the liquid crystal molecule arrangement therebetween is controlled, such that a predetermined image is displayed.

In the case of a general liquid crystal display, the common electrode 70 is integrally formed at entire lower surface of the second substrate 61 and is applied with same voltage. In contrast, the liquid crystal display according to the present example embodiment includes a plurality of common electrodes 70 divided from each other such that the display may use the common electrode 70 as a touch sensing electrode of the capacitive type touch sensor.

Referring to the example embodiment shown in FIG. 4, the common electrode 70 may be formed to be long in a first direction (for example, an X-axis direction) and be arranged in plural in a direction intersected with the first direction and a second direction (for example, a Y-axis direction).

For example, the common electrode 70 may be configured as a first common electrode X1 to an $n^{th}$ common electrode Xn. An example for n common electrodes (X1 to Xn) is shown in FIG. 4.

The sensing electrode 72 is spaced apart from the common electrode 70 and may be operated in the manner of a capacitive type touch sensor with the common electrode 70.

The sensing electrode 72 may be positioned on the second substrate 61 so as to be intersected with the common electrode 70. For example, the sensing electrode 72 may be formed to be long in the second direction and be arranged in plural in the first direction. By the arrangement of the common electrode 70 and the sensing electrode 72, a mutual capacitance is formed at the intersection between the common electrode 70 and the sensing electrode 72, and each of the intersections formed the mutual capacitance is operated by each a sensing cell 100 implementing a touch recognition.

The sensing electrode 72 may be formed of a transparent conductive material, and also formed of other conductive material such as an opaque metal. For example, the sensing electrode 72 may be formed of indium tin oxide (ITO), indium zinc oxide (IZO), graphene, carbon nanotube, silver nanowires (AgNWs), and the like.

The control unit 6 receives a input control signal controlling image signals R, G, B input from the outside for display, and may be supplied with the image signal DAT and a data control signal DCS to the data drive unit 4. For example, the control unit 6 may receive a vertical synchronizing signal (Vsync), a horizontal synchronization signal (Hsync), a main clock signal (Mclk), a data enable signal (DE), or the like, and may output the data control signal DCS. For example, the data control signal DCS may include a source start pulse (SSP), a source shift clock signal (SSC), a source output enable signal (SOE), a polarity control signal (POL), or the like.

The data drive unit 4 receives the image signal DAT and the data control signal DCS and then may supply the data signals corresponding to the image signal DAT to each of the data wires D1 to Dm.

Meanwhile, the control unit 6 may supply a gate control signal GCS to the gate drive unit 3 for controlling the gate drive unit 3. Further, the control unit 6 may supply a scan start signal STV with a gate control signal GCS to the gate drive unit 3.

Accordingly, the gate drive unit 3 receives the gate control signal GCS and the scan start signal STV and may supply the gate signal to the gate wires G1 to Gn.

The gate signals are sequentially supplied to the gate wires G1 to Gn such that the pixels P are sequentially selected by line, and then the selected pixels P may receive the data signals from the data wires D1 to Dm.

The gate control signal GCS supplied from the control unit 6 to the gate drive unit 3 may include a first clock signal CLK and a second clock signal CLKB.

The first clock signal CLK and the second clock signal CLKB may have a different phase from each other.

Figure 5:
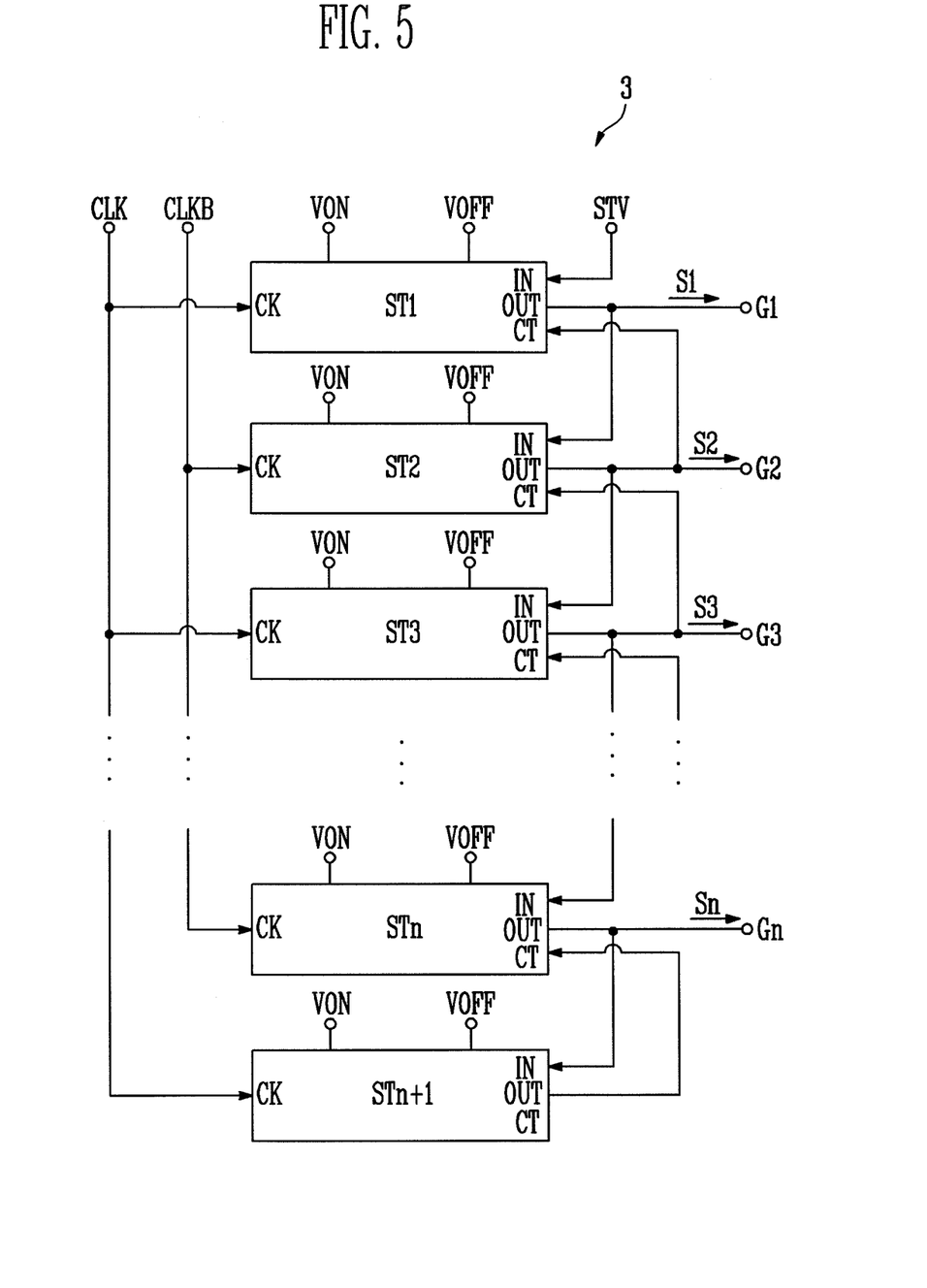
FIG. 5 is a view showing an example embodiment of a gate drive unit shown in FIG. 1.

FIG. 5 is a view showing an example embodiment of a gate drive unit shown in FIG. 1.

Referring to the example embodiment shown in FIG. 5, the gate drive unit 3 includes a plurality of stages ST1 to STn+1. Each of the stages ST1 to STn+1 is connected in a cascade configuration, e.g., output terminals OUT of each of the stages ST1 to STn+1 may be connected to input terminals IN of the next stage. For example, in the case in which the number of gate wires is 100, the stages may be configured to 100 stages SR1 to SR100, corresponding to the gate wires, and one dummy stage SR101.

Each of stages ST1 to STn+1 may include the input terminal IN, the output terminal OUT, a control terminal CT, a clock signal input terminal CK, a gate on voltage terminal VON, and a gate off voltage terminal VOFF.

The scan start signal STV, which is output from the control unit 6, may be input to the input terminal IN of a first stage ST1.

The output signals S1 to Sn from each of the stages ST1 to STn+1 are gate signals for driving each gate line so as to be output to the gate line G1 to Gn corresponding thereto.

The first clock signal CLK is supplied to the odd-numbered stages ST1, ST3, and the like, and the second clock signal CLKB may be supplied to the even-numbered stages ST2, ST4, and the like.

The first clock signal CLK may be set to have a reversed-phase of the second clock signal CLKB.

The control terminal CT in each of the stages ST1 to STn+1 may receive an output signal from the next stage as a control signal.

The control signal input to the control terminal CT is delayed by duty period of the output signal itself. Accordingly, the output signals S1 to Sn from each of the stages ST1 to STn+1 are sequentially generated by active period, such that the gate lines G1 to Gn corresponding to each active period of the output signals S1 to Sn may be operated. For example, each stage ST1 to STn+1 of the gate drive unit 3 may be an amorphous silicon gate (ASG) circuit formed of an amorphous thin film transistor.

In addition, each stage ST1 to STn+1 of the gate drive unit 3 may be implemented as various circuits using the first clock signal CLK and the second clock signal CLKB.

The common electrode drive unit 5 serves to control a plurality of common electrodes 70. The common electrode drive unit 5 may drive the common electrode 70 referring to the control signal CSS supplied from the control unit 6.

Figure 6:
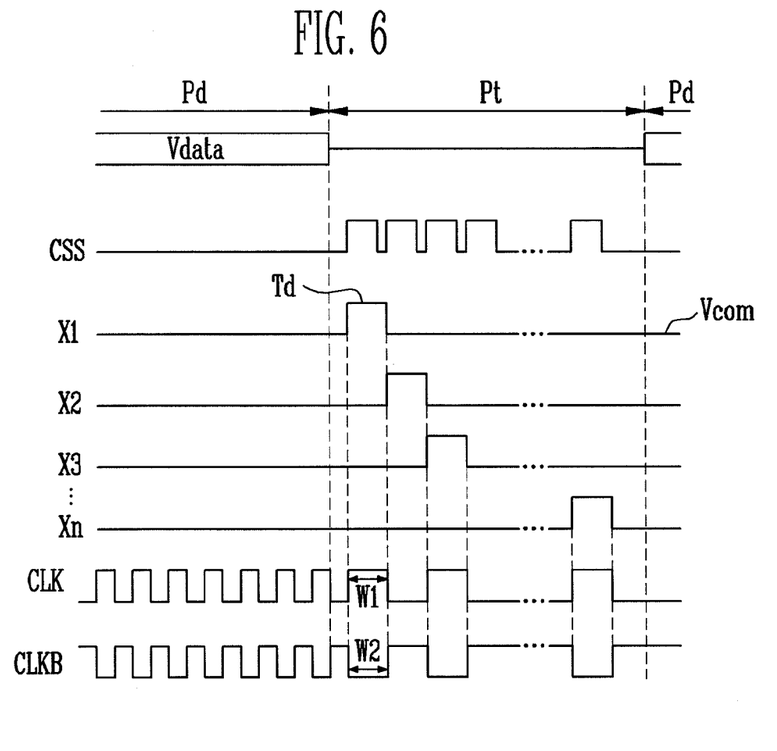
FIGS. 6 and 7 are waveform diagrams showing a driving operation of a liquid crystal display integrated with a touch sensor according to an example embodiment.

FIG. 6 is a waveform diagram showing a driving operation of a liquid crystal display integrated with a touch sensor according to an example embodiment. Particularly, the case of the common electrode 70 configured to a first common electrode X1 through n common electrode Xn is shown in FIG. 6. Referring to FIG. 6, the liquid crystal display integrated with a touch sensor according to the example embodiment may be operated to be divided into a display period and a touch driving period.

The display period Pd and the touch driving period Pt may be alternately performed.

The display period Pd means a period that a predetermined image is displayed according to the data signal Vdata supplied to the pixels P.

Voltage of the common electrode 70 is constantly maintained for displaying image normally, so that each of the common electrodes 70 receive the same magnitude of common voltage Vcom.

The common electrode drive unit 5 may supply the same magnitude of the common voltage Vcom to each common electrode 70 during the display period Pd.

The touch driving period Pt means the period of driving by the capacitive type touch sensor for recognizing touch, during this period the common electrode 70 may be used as a touch sensing electrode with sensing electrode 72.

A plurality of the common electrodes 70 may sequentially receive the touch driving signal Td. For example, in the case where the common electrode 70 may be configured a first common electrode X1 to an $n^{th}$ common electrode Xn, the touch driving signal Td may be sequentially supplied from the first common electrode X1 to the $n^{th}$ common electrode Xn.

The common electrode drive unit 5 may sequentially supply the touch driving signal Td to each common electrode 70 during the touch driving period Pt.

The touch driving signal Td is to determine the touch position, and may have a voltage having a higher value than that of the common voltage Vcom.

During the touch driving period Pt, the first clock signal CLK and the second clock signal CLKB supplied to the gate drive unit 3 may be synchronized with the touch driving signal Td. Thus, a rising edge and a falling edge in the first clock signal CLK may be set to be aligned with a rising edge and a falling edge in the touch driving signal Td. Also, a rising edge and a falling edge in the second clock signal CLKB may be set to be aligned with a rising edge and a falling edge in the touch driving signal Td.

An example in which width of the gate control signal GCS is same with that of the touch driving signal Td is shown in FIG. 6. In order to synchronize the gate control signal GCS and the touch driving signal Td, the width W1 of the first clock signal CLK may be set to be same with that of the touch driving signal Td, and the width W2 of the second clock signal CLKB may also be set to be same with that of the touch driving signal Td.

An interference phenomenon between the gate control signal GCS and the touch driving signal Td may be initialized, thereby helping to prevent deterioration of the image and touch sensitivity.

Figure 7:
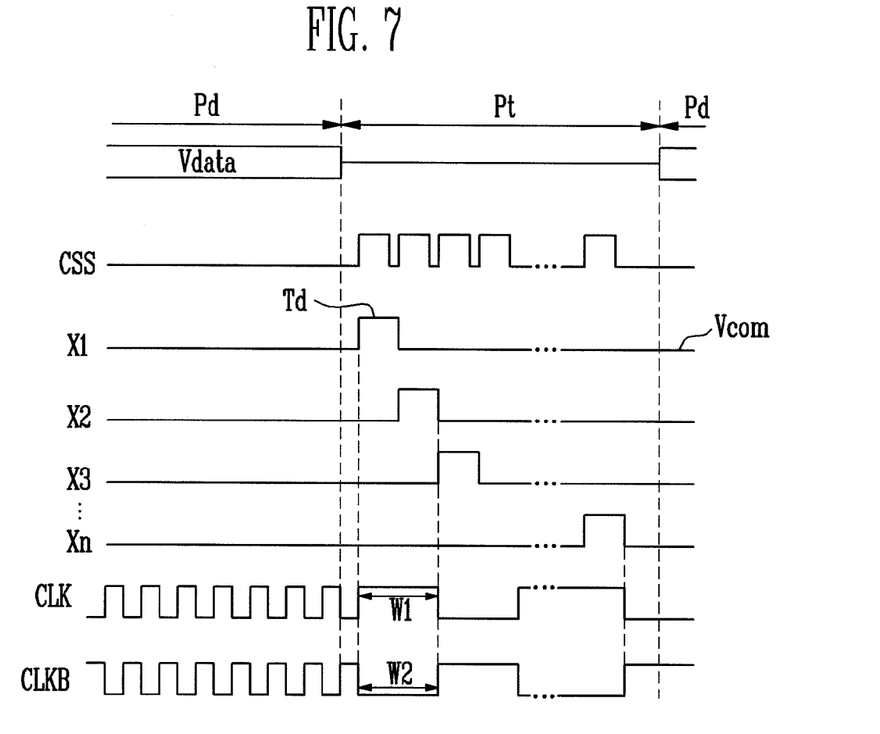

FIG. 7 is a waveform diagram showing a driving operation of a liquid crystal display integrated with a touch sensor according to another example embodiment.

An example in which width of the gate control signal GCS is set to be integer times of that of the touch driving signal Td is shown in FIG. 7, the integer being greater than one. For example, in order to synchronize the gate control signal GCS with the touch driving signal Td, the width W1 of the first clock signal CLK may be set to be doubled relative to that of the touch driving signal Td, and the width W2 of the second clock signal CLKB may also be set to be doubled relative to that of the touch driving signal Td.

Figure 8:
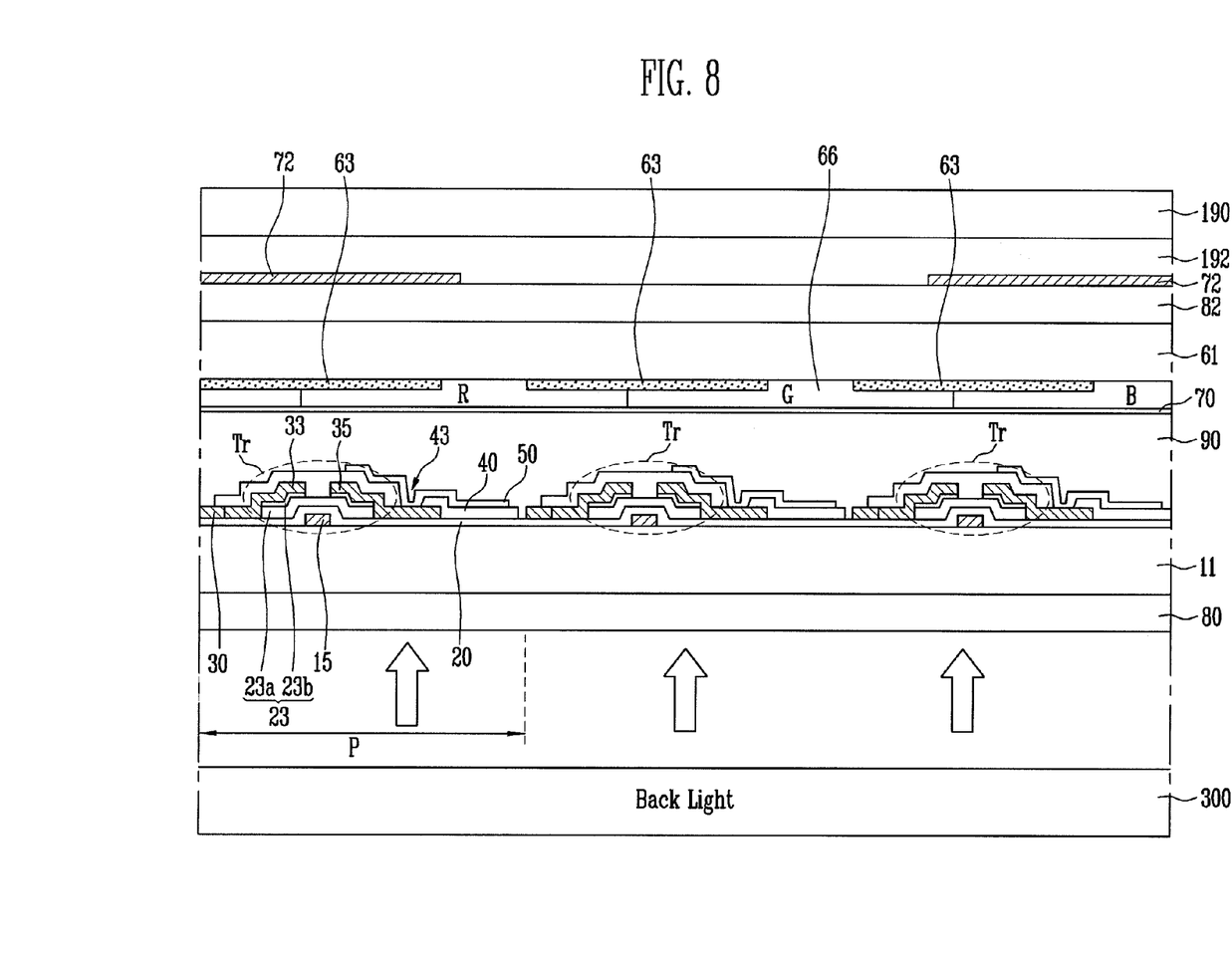
FIG. 8 is a cross-sectional view showing a region of a liquid crystal display integrated with a touch sensor according to another example embodiment.

FIG. 8 is a cross-sectional view showing a region of a liquid crystal display integrated with a touch sensor according to another example embodiment. Hereinafter, details set forth above in connection with previous embodiments will not be repeated.

Referring to the example embodiment shown in FIG. 8, first and second polarizing plates 80 and 82 may be attached to external surfaces of the first and second substrates 11 and 61.

In addition, a window 190 having a transparency may be attached on the polarizing plate 82 positioned in direction where the image is displayed.

As shown in FIG. 8, a back light 300 is positioned below the first substrate 11 so that the image is displayed in the direction of the second substrate 61. The window 190 may be attached on the second polarizing plate 82 by an adhesive layer 192.

Referring to FIG. 8, since the example embodiment has a first polarizing plate 80, the back light 300 may be positioned below the first polarizing plate 80.

In the case in which the second polarizing plate 82 and the window 190 are installed, the sensing electrodes 72 may be positioned between the second substrate 61 and the window 190.

As shown in FIG. 8, the sensing electrodes 72 may be positioned on the second polarizing plate 82 or below the window 190, otherwise, the sensing electrodes 72 may be positioned on the second substrate 61 or below the second polarizing plate 82.

By way of summation and review, a touch sensor is a device to help input a user's command to a display device, or the like, by detecting approach or contact of his/her hand or an object. The touch sensor may be provided to the image display device to convert a contact position directly contacted by the human hand or an object into an electric signal. The instruction contents selected at the contact position may be recognized as an input signal. Since a touch sensor may be substituted for a separate input device such as a keyboard, a mouse, etc., which are connected to the display device and operated, application fields thereof have been gradually extended.

Types of touch sensors may include a resistive type, an optical sensing type, a capacitive type, and the like. Among them, the capacitive type touch sensor senses a change in the capacitance formed by a conductive electrode with other adjacent electrode or a ground electrode or the like, when a user's hand or object contacts thereto. Therefore, the contact position may be detected.

A touch sensor may be attached on an external surface of a liquid crystal display. If the touch sensor is attached to an external surface of a liquid crystal display, an adhesive layer may be provided between the touch sensor and the liquid crystal display, and manufacturing process of the touch sensor separated from the liquid crystal display may be used. Such an approach may result in increased process time and cost. Accordingly, a liquid crystal display integrated with a touch sensor using common electrode of a liquid crystal display as a touch sensing electrode has been considered.

In a liquid crystal display integrated with a touch sensor, operation may be performed by dividing into a display period and a touch drive period. During the touch drive period, deterioration of image and touch sensing may be generated due to a coupling phenomenon which is generated between control signals supplied to a gate drive unit and drive signals supplied to common electrodes.

As described above, embodiments relate to a liquid crystal display integrated with a mutual capacitance type touch sensor. Embodiments may provide a liquid crystal display integrated with a touch sensor that may help prevent deterioration of an image and a touch sensing degree by synchronizing control signals of a gate drive unit and drive signals supplied to common electrodes.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A liquid crystal display integrated with a touch sensor, the display comprising,
    a first substrate including pixels, the pixels connected to gate wires and data wires;
    a second substrate facing the first substrate;
    a plurality of common electrodes corresponding to the pixels;
    a plurality of sensing electrodes on the second substrate;
    a liquid crystal layer between the first substrate and the second substrate;
    a controller to generate a gate control signal;
    a gale driver to receive the gate control signal from the controller, to generate a gate signal based on the gate control signal, and to supply the gate signal to the pixels through the gate wires;
    a common electrode driver to generate a touch driving signal and to supply the touch driving signal to the common electrodes during a touch driving period, wherein:
    the controller supplies the gate control signal being synchronized with the touch driving signal to the gate driver during the touch driving period,
    the gate control signal includes at least one clock signal in the touch driving period, the at least one clock signal has a pulse width that is an integer multiple of a pulse width of the touch driving signal, and
    the at least one clock signal has a first width size in a display period, and has a second width size different from the first width size in the touch driving period, and wherein
    the second width size is adjusted from the first width size such that edges of the at least one clock signal are synchronized with edges of the touch driving signal.

2. The display as claimed in claim 1, wherein the common electrode driver is configured to supply a common voltage to the common electrodes during the display period.

3. The display as claimed in claim 2, wherein the display period and the touch driving period alternate.

4. The display as claimed in claim 2, wherein the touch driving signal has a higher voltage than that of the common voltage.

5. The display as claimed in claim 1, wherein the common electrodes are on the first substrate or the second substrate.

6. The display as claimed in claim 1, further comprising:
    a first polarizing plate and a second polarizing plate respectively attached to an external surface of the first substrate and the second substrate; and
    a window attached to an external surface of the second polarizing plate.

7. The display as claimed in claim 6, wherein the sensing electrodes are between the second substrate and the window.

8. The display as claimed in claim 1, further comprising a back light positioned below the first substrate and configured to supply light.

9. The display as claimed in claim 1, wherein the common electrodes and the sensing electrodes intersect with each other.

10. The display as claimed in claim 1, wherein the integer multiple is 2 or more.

11. The display as claimed in claim 1, wherein the at least one clock signal includes first and second clock signals, each of the first and second clock signals having the pulse width that is the integer multiple of the pulse width of the touch driving signal.

12. The display as claimed in claim 1, wherein the at least one clock signal includes first and second clock signals having a reversed phase from each other.

* * * * *